United States Patent
Gomez et al.

(10) Patent No.: US 12,047,393 B2
(45) Date of Patent: Jul. 23, 2024

(54) COMPUTER SYSTEM ATTACK DETECTION

(71) Applicant: SAP SE, Walldorf (DE)

(72) Inventors: Laurent Y. Gomez, Le Cannet (FR); Cedric R. J. Hebert, Mougins (FR); Slim Trabelsi, Biot (FR)

(73) Assignee: SAP SE, Walldorf (DE)

( * ) Notice: Subject to any disclaimer, the term of this patent is extended or adjusted under 35 U.S.C. 154(b) by 523 days.

(21) Appl. No.: 17/401,873

(22) Filed: Aug. 13, 2021

(65) Prior Publication Data

US 2023/0046392 A1    Feb. 16, 2023

(51) Int. Cl.
 *H04L 29/06*    (2006.01)
 *G06N 20/20*    (2019.01)
 *H04L 9/40*    (2022.01)

(52) U.S. Cl.
 CPC ......... *H04L 63/1416* (2013.01); *G06N 20/20* (2019.01); *H04L 63/1425* (2013.01); *H04L 63/20* (2013.01)

(58) Field of Classification Search
 CPC . H04L 63/1416; H04L 63/1425; H04L 63/20; G06N 20/20; G06N 3/08
 See application file for complete search history.

(56) References Cited

U.S. PATENT DOCUMENTS

| | | | | |
|---|---|---|---|---|
| 9,123,027 | B2 * | 9/2015 | Srivastava | H04L 63/1441 |
| 11,240,266 | B1 * | 2/2022 | Freire | H04L 63/1425 |
| 2018/0097841 | A1 * | 4/2018 | Stolarz | H04K 1/00 |
| 2018/0359280 | A1 * | 12/2018 | Elworthy | H04L 63/1416 |
| 2020/0234109 | A1 * | 7/2020 | Lee | G06N 3/08 |
| 2021/0312395 | A1 * | 10/2021 | Harsham | H04L 51/18 |

* cited by examiner

*Primary Examiner* — Joseph P Hirl
*Assistant Examiner* — Thomas A Gyorfi
(74) *Attorney, Agent, or Firm* — SCHWEGMAN LUNDBERG & WOESSNER, P.A.

(57) ABSTRACT

In an example embodiment, a combination of machine learning and rule-based techniques are used to automatically detect social engineering attacks in a computer system. More particularly, three phases of detection are utilized on communications in a thread or stream of communications: attack contextualization, intention classification, and security policy violation detection. Each phase of detection causes a score to be generated that is reflective of the degree of danger in the thread or stream of communications, and these scores may then be combined into a single global social engineering attack score, which then may be used to determined appropriate actions to deal with the attack if it transgresses a threshold.

20 Claims, 7 Drawing Sheets

COMPUTER SYSTEM ATTACK DETECTION

BACKGROUND

Information technology (IT) computer systems have long utilized security measures to prevent undesired intrusions into their systems and prevent unauthorized data access. People, however, are often the weakest link in an IT cybersecurity system. More particularly, even when a potential intruder may be unable to directly hack into a computer system due to effective security, such intruders may be able to target individuals who have security credentials or otherwise have access to sensitive information and convince them to unwittingly disclose such credentials or information.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

There has been an increased use of social engineering attacks by such intruders in recent years. Social engineering attacks aim at manipulating individuals, through psychological or cognitive biases, to gain access to restricted IT systems, data, or applications.

A social engineering attack involves the psychological manipulation of people into performing actions or divulging confidential information. Leveraging cognitive biases, the social engineering attacker aims at increasing his or her psychological influence on a target. This includes a number of different phases of attack, including information gathering, where the attacker conducts intelligence activities to gather background information in order to establish a trusted relationship; relationship development, where the attacker leverages psychological and cognitive biases to strengthen the relationship with the victim and to psychologically and mentally manipulate the target; exploitation, where the relationship is leveraged to gain access to restricted information, system access, or an application; and execution, where fraudulent access is granted to a system/application/facility based on the extracted information, and the attacker executes its malicious operations.

In an example embodiment, a combination of machine learning and rule-based techniques are used to automatically detect social engineering attacks in a computer system. More particularly, three phases of detection are utilized on communications in a thread or stream of communications: attack contextualization, intention classification, and security policy violation detection. Each phase of detection causes a score to be generated that is reflective of the degree of danger in the thread or stream of communications, and these scores may then be combined into a single global social engineering attack score, which then may be used to determined appropriate actions to deal with the attack if it transgresses a threshold.

Figure 1:
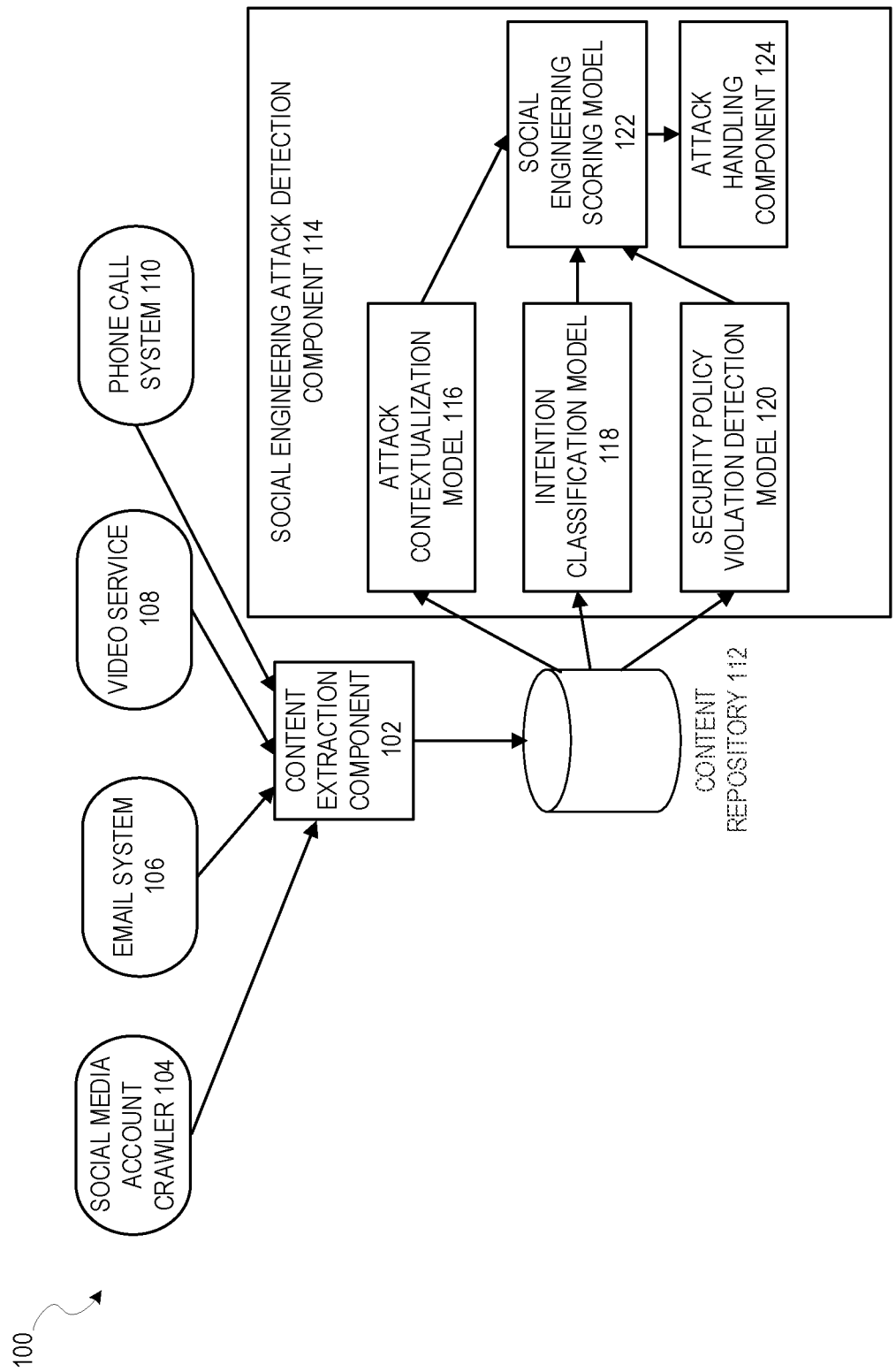
FIG. 1 is a block diagram illustrating an architecture for detecting social engineering attacks in a computer system, in accordance with an example embodiment.

FIG. 1 is a block diagram illustrating an architecture 100 for detecting social engineering attacks in a computer system, in accordance with an example embodiment. A content extraction component 102 extracts content from multiple different electronic data sources, including a social media account crawler 104, an email system 106, a video service 108, and a phone call system 110. It should be noted that social media account crawler 104, email system 106, video service 108, and phone call system 110 are merely examples of possible electronic data sources from which the content extraction component 102 can extract information, and electronic data sources other than these specific ones may be utilized.

One type of content extracted by the content extraction component 102 includes a thread or stream of communications between a potential attacker and a potential victim. Such a thread or stream may be defined as a group of one or more communications, in any electronic form, between the potential attacker and the potential victim. In some cases, this group may comprise all electronic communications between the potential attacker and the potential victim. Thus, for example, the content extraction component 102 may extract all communications between a potential attacker and a potential victim and store them as one thread or stream, and then all communications between the potential attacker and a different potential victim and store them as a separate thread or stream. In other cases, the content extraction component 102 may include a mechanism that detects common related themes among certain communications between the potential attacker and potential victim, or even across multiple potential victims, and thus may group the communications differently.

In an example embodiment, the communications may be extracted in, or converted to, textual format. Certain communications, such as email communications, may already be in textual format, while other communications, such as video or phone conversations, may need to be converted into textual format using a transcription component. The transcription component may utilize signal analysis to convert sound to a spectrogram. The sound signal may be split into time frames and a time frame signal can be split into frequency components with a fast Fourier transform (FFT). The time frame signal is then represented with a vector of amplitudes at different frequencies. The spectrogram is the result of lining up the vectors in time series order. Feature extraction can then be used to put the frequencies into bins that are relevant to human speech. This allows for breaking up the sounds into phonemes, which can then be mapped to matching words using lexical decoding.

Natural language processing (NLP) and deep learning neural networks may then utilize techniques such as sentence tokenization, word tokenization, text lemmatization and stemming, stop words, regex, bag-of-words, and term frequency-inverse document frequency (TF-IDF) measurement to derive meaning for the words and phrases in the spoken text.

The second type of content that is extracted by the content extraction component 102 is verification information. This is information that may be used to validate statements or assertions made in the communications. One example data source for such verification information is the social media account crawler 104, which may crawl one or more social networking services to obtain user profile and/or user interaction information with the one or more social networking services. For example, the user profiles of a potential attacker from multiple social networking services may be retrieved, along with interaction information (e.g., posts) made by the potential attacker on those social networking services. As will be described later, this information may be used to determine whether certain assertions made in the communications are accurate. One example might include determining whether a profile photo in a social networking service user profile corresponding to a potential attacker is not unique to that potential attacker (e.g., is a stock photo or one stolen from another user). Another example might include determining if the job title and place of employment listed in a social networking service user profile corresponding to the potential attacker matches a job title and place of employment that the potential attacker tells the potential target in the communications thread or stream.

Both types of extracted content may be stored in a content repository 112.

A social engineering attack detection component 114 contains an attack contextualization model 116, an intention classification model 118, and a security policy violation detection model 120. Each of these models 116, 118, 120 accesses extracted content stored in the content repository and uses this extracted content as input to its respective model to output a score. More particularly, the attack contextualization model 116 outputs an attack contextualization score, the intention classification model 118 outputs an intention classification score, and the security policy violation detection model 120 outputs a security policy violation detection score. These scores are then input to a social engineering scoring model 122, which combines the scores into a global social engineering attack score. This global social engineering attack score may then be used by an attack handling component 124 to perform one or more actions if the global social engineering attack score transgresses a threshold, such as alerting an administrator to a possible social engineering attack, launching automatic countermeasures (e.g., locking the potential target's account so that no access to the IT system is possible) to attempt to mitigate or prevent the attack, or the like. This may be based on the global social engineering attack score transgressing a predetermined threshold.

It should be noted that this predetermined threshold need not be fixed and could be variable based on the environment or situation. For example, a different threshold may be set for one employer versus a different employer or may vary based on industry.

In an example embodiment, each of the attack contextualization model 116, the intention classification model 118, and the security policy violation detection model 120 are implemented using a combination of rule-based and machine-learning based techniques.

Turning first to the attack contextualization model 116, the goal of this model is to understand the circumstances of the communications in a thread or stream and to assign a score indicative of the riskiness or likelihood of the communications being part of a social engineering attack to the thread or stream. This may include, for example, detecting any malicious content in the thread or stream, such as a fake identity, fake content, or communications that match some well-established scam or attack.

Figure 2:
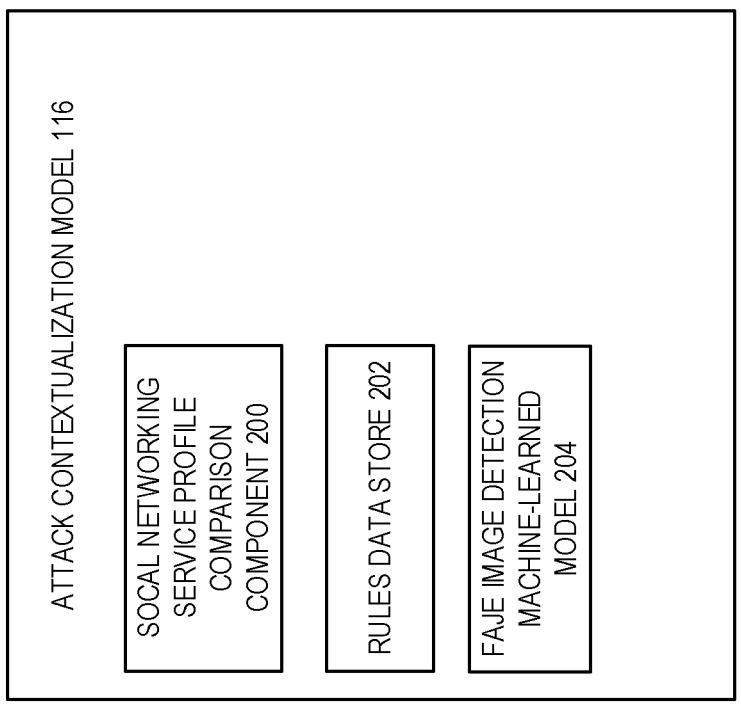
FIG. 2 is a block diagram illustrating an attack contextualization model in more detail, in accordance with an example embodiment.

FIG. 2 is a block diagram illustrating an attack contextualization model 116 in more detail, in accordance with an example embodiment. A social networking service profile comparison component 200 may retrieve information about the potential attacker's social networking service user profile(s) from the content repository 112, use that information to evaluate whether or not the potential attacker is who he or she claims to be, and generate a score based on that likelihood (with the score being higher the less likely it is that the potential attacker is who he or she claims to be). This may include executing various rules in a rules data store 202. These rules may include, for example, a rule to compare a creation date for each social networking service user profile(s) with a current date to see if the user profile was recently created (which may be indicative of a fake user), a rule comparing factual information about the user in each social networking service user profile(s) to factual information described in the communications in the thread or stream (such as name, title, location, place of employment, educational background, skills, etc.), and a rule determining how frequently the social networking service user profile(s) send communications (too frequent communications may be indicative of a bot rather than a legitimate user). Other rules could investigate social networking connections of the user accounts ("friends," "linked users," "followers," etc.) and can be recursively fired to determine if those connections are themselves fake accounts.

Another of these rules might be to determine whether a profile image associated with each social networking service user is fake. This may include, for example, comparing the profile image to a library of stock profile images or stock images in general, and if the profile image matches a stock image or stock profile image, this would be indicative of the profile image being fake. If that rule fails, in an example embodiment, a separate fake image detection machine-learned model 204 may be utilized to determine whether the profile image is a computer-generated picture.

In an example embodiment, the fake image detection machine-learned model may be or include a multilayer perceptron network. An output layer may contain two neurons—one for a fake image and one for a real image. Depending upon the value of these neuron outputs, it can be determined whether the image is fake. The multilayer perceptron network may be trained to identify whether a compression ratio of one portion of the image is greater than that of the remainder of the image, which may be indicative of image alteration of that portion.

Referring back to FIG. 1, turning next to the intention classification model 118, the goal here is to evaluate the overall intention between an interaction between a potential attacker and a potential victim. In an example embodiment, this includes an analysis of the communications in a thread or stream to see if it is indicative of any of six different cognitive biases: authority, likeness, reciprocity, scarcity, consistency, and social proof.

Figure 3:
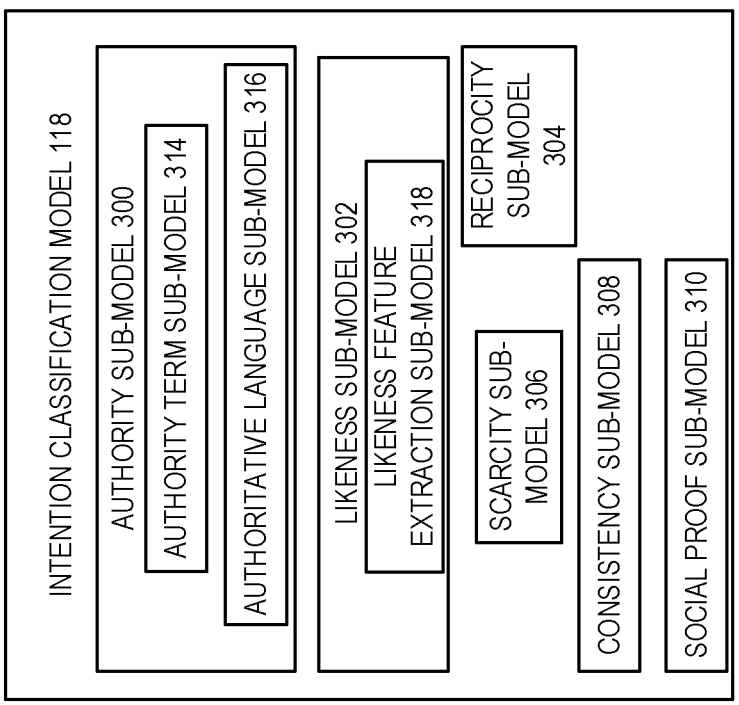
FIG. 3 is a block diagram illustrating an intention classification model, in accordance with an example embodiment.

FIG. 3 is a block diagram illustrating an intention classification model 118, in accordance with an example embodiment. The intention classification model 118 includes an authority sub-model 300, a likeness sub-model 302, a reciprocity sub-model 304, a scarcity sub-model 306, a consistency sub-model 308, and a social proof sub-model 310. Additionally, an intention classification score generator combines output from each of the authority sub-model 300, likeness sub-model 302, reciprocity sub-model 304, scarcity sub-model 306, consistency sub-model 308, and social proof sub-model 310 and generates a single intention classification score based upon them.

The authority sub-model 300 evaluates whether the communications in the thread or stream are indicative of a potential attacker building trust with the potential victim through authority. This may include evaluating whether the language in the communication itself is an indication of authority (such as listing an authoritative job title, qualification, or skill in the communications—e.g., "I work for the FBI," "I am chief of cybersecurity at Apple," etc.) and whether the language is similar in tone to whose of actual authority (e.g., use of the imperative sentence structure). As such, the authority sub-model 300 may itself comprise two sub-models: an authority term sub-model 314 and an authoritative language sub-model 316. The authority term sub-model 314 may utilize extracted names and titles from the communications in the thread or stream and compare them with a database of titles and names bound to authority (e.g., "CEO," "Doctor," "Joe Biden," "Donald Trump"). This comparison may include computing a distance between an embedding of a term in the communications in the thread or stream and embeddings of terms in the database, wherein the embedding is performed by a machine-learned model trained to cluster similar terms together geometrically in a multidimensional space. This distance computation may include, for example, a cosine or Levenshtein distance, or may be performed using a clustering algorithm, such as a k-nearest neighbor algorithm.

In some example embodiments, the authority sub-model 300 may further identify information about the potential victim, such as the potential victim's job title/place of employment, and use this information to identify a spot on an organizational hierarchy for the place of the employment that corresponds to the potential victim. The authority sub-model may then further compare this hierarchical spot with the terms used by the potential attacker, to determine whether the potential attacker is indeed naming an accurate job title/name in the hierarchy (and thus helping to determine whether or not the potential attacker is indeed a superior to the potential victim in the organizational hierarchy of the potential victim's place of employment).

The authoritative language sub-model 316 may perform NLP techniques on the communications to classify phrases or sentences into grammatical structures, and therefore identify which phrases or sentences in the communications in the thread or stream are authoritative in structure.

The authority sub-model 300 may then assign a score to the thread or stream based on the output of the authority term sub-model 314 and the output of the authoritative language sub-model 316. In an example embodiment, the score may be a weighted average of scores output by the authority term sub-model 314 and the authoritative language sub-model 316.

The likeness sub-model 302 evaluates whether the communications in the thread or stream are indicative of the potential attacker attempting to get the potential target to like them, particularly by persuading the potential target that the potential attacker is similar to them. This may be accomplished by using a likeness feature extraction sub-model 318 to extract one or more likeness features from the communications. These likeness features may be ones that a machine learning algorithm has trained the likeness feature extraction sub-model 318 to identify based on their likelihood to be similar to the potential target's features in a likeness persuasion portion of an attack. Examples of such features include names, date of birth, address, hobbies, and skills. These extracted features from the communications may be compared with the corresponding features of the potential target, based on a distance calculation (a literal distance calculation in the case of address, whereas distance for the other feature could be based on distance between embeddings of the feature values in an n-dimensional space).

In an example embodiment, the likeness sub-model may assign a score to the thread or stream based on the distances of the above-described features.

The reciprocity sub-model 304 evaluates whether the communications in the thread or stream offer some sort of reward (whether tangible, such as money or job opportunity, or intangible, such as praise) to the potential target. Such rewards imbue a sense of reciprocity in people, making it more likely for the potential target to feel an obligation to provide something in return. In that manner, the reciprocity sub-model 304 may perform NLP techniques on the communications to classify phrases or sentences into categories of reward, reward-seeking, or neither. Threads or streams with communications that include phrases of reward and also include phrases of reward seeking may be assigned a higher score than those without.

The scarcity sub-model 306 evaluates whether the communications in the thread or stream indicate some sort of scarcity of an item or service or a time limit. Potential targets are more likely to feel pressure to perform some action if they feel they may "miss out," either because someone else may get the product or service first or because a time limit on obtaining the product or service may expire.

In that manner, the scarcity sub-model 306 may perform NLP techniques on the communications to classify phrases or sentences into categories of scarcity or not. Threads or streams with communications that include phrases related to scarcity (e.g., "limited," "running out," "time") may be assigned a higher score than those without.

The consistency sub-model 308 evaluates whether the communications in the thread or stream indicates if the communications are consistent with each other. This includes, for example, identifying facts asserted by one communication and making sure that these facts are consistent with facts asserted by other communications in the thread or stream. For example, if a potential attacker lists a particular job title in a first communication, the consistency sub-model 308 determines if this matches the job title in other communications. Thus, part of this process is determining when a portion of a communication is an asserted fact or not. In that manner, the consistency sub-model 308 may perform NLP techniques on the communications to classify phrases or sentences into categories of facts or not. Each of the facts may be further classified into the type of fact (e.g., job title, employer), and then the values for the types of facts across all communications in the thread or stream are compared for similarity. The consistency sub-model 308 may then assign a score to the thread or stream that is inversely correlated with the similarity.

The social proof sub-model 310 determines a level of social proof of the communications. Social proof includes pressuring a potential target by indicating that the potential target's peers or other users are performing a desired action. This pressure may come in many forms by a potential attacker. The first is the use of social proof phrases or sentences in the communications ("90% of people in your position use this service"). In this manner, the social proof sub-model 310 may perform NLP techniques on the communications to classify phrases or sentences into categories of social proof or not.

A second form in which the pressure may come is having the potential target hear the same message from another source. For example, a potential attacker could set up multiple social media accounts to convey the same message, allegedly from different sources or may falsely cause a message, such as a tweet, to be liked or retweeted (e.g., by setting up dummy accounts to cause the social media shares to be performed, again allegedly by different sources). In this manner, the social proof sub-model 310 may also determine whether phrases or sentences in the communications are repeated from "different" potential attackers to the same potential victim (different in this context meaning one that appears on its surface to be sent from a different user, such as coming from a different email address or handle, but that in fact is not from a different user).

The social proof sub-model 310 takes information about both these pressures and generates a score indicative of a likelihood that social proof is being used in the communications in the thread or stream.

It should be noted that these sub-models are merely examples of some sub-models that may be utilized and are not intended to be limiting. Sub-models for other types of detections, such as detecting anchoring (where an initial fact is presented in order for a subsequent fact to be favorable compared to it) or moving the goal post (where an action indicate as desired by the communications is changed slightly from communication to communication), may be utilized as well.

Referring back to FIG. 1, the security policy violation detection model 120 determines the scope of the interaction with the potential target and specifically spots any request that is uncompliant with a security policy, such as a security policy of the potential target's employer. This includes detection of a request to grant access to a restricted system/application/facility and detection of a request for confidential information (e.g., address, financial figures, credit card number, name, phone number, social security number, etc.).

Figure 4:
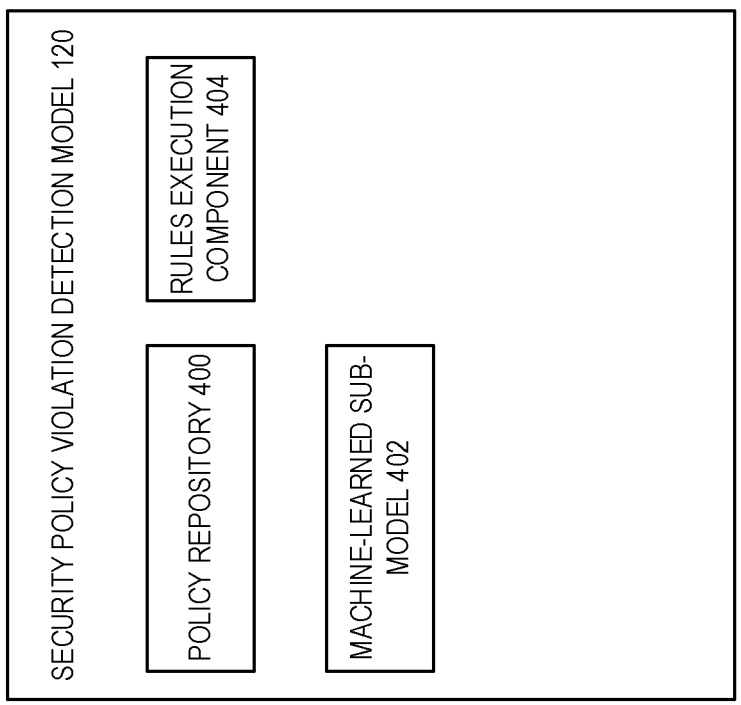
FIG. 4 is a block diagram illustrating a security policy violation detection model, in accordance with an example embodiment.

FIG. 4 is a block diagram illustrating a security policy violation detection model 120, in accordance with an example embodiment. Here, a policy repository 400 may be accessed to retrieve one or more security policies associated with communications in a thread or stream. The policies may include, for example, a policy associated with an employer of the recipient of the communications, but also could include policies relating to communications generally or to other categories. This may be performed using a mix of machine learning (using machine-learned sub-model 402) and rules (using rules execution component 404). The machine-learned sub-model 402 may be trained using a machine learning algorithm to detect that a communication requests information that is subject to a security policy, such as a bitcoin wallet address or a wire transfer, or otherwise asks for money or a password. The machine-learned sub-model 402 may also be trained to identify actual information subject to a security policy, sent from the potential target, such as a password.

Referring back to FIG. 1, as described earlier, the social engineering scoring model 122 then takes the scores generated by the attack contextualization model 116, the intention classification model 118, and the security policy violation detection model 120 and combines them into a single global social engineering attack score. In an example embodiment, this combination is achieved through a weighted average, wherein each of the scores is modified by a weight corresponding to the model from which it came, prior to being combined with the other scores. For example, the score of the attack contextualization model 116 may be modified by multiplying it by a first weight, the score of the intention classification model 118 may be modified by multiplying it by a second weight, and the score of the security policy violation detection model 120 may be modified by multiplying it by a third weight. In an example embodiment, a machine-learned model may be used to learn these respective weights based on training data. For example, the weights may be different for different users or groups of users.

Figure 5:
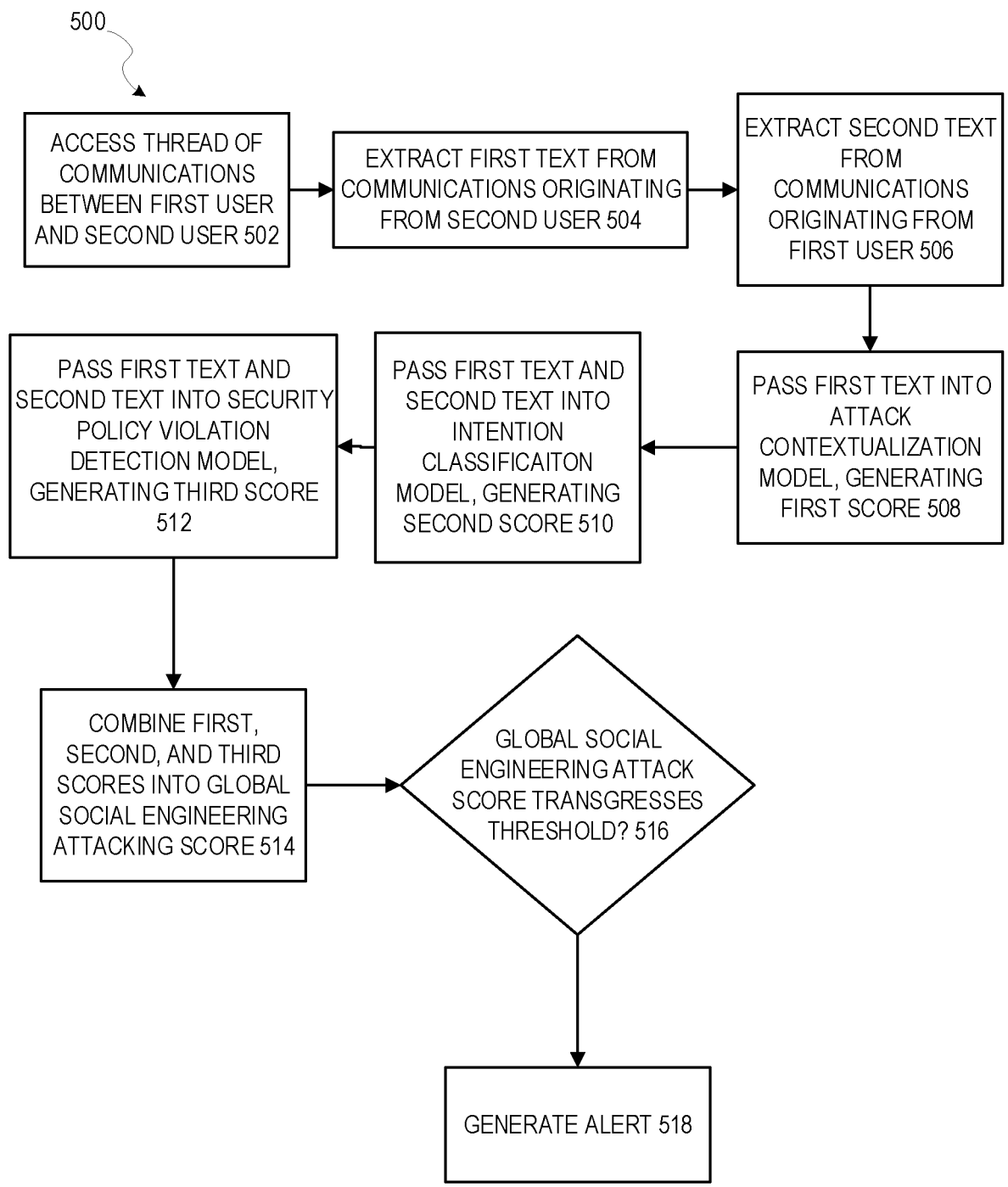
FIG. 5 is a flow diagram illustrating a method of detecting an attack in a computer system, in accordance with an example embodiment.

FIG. 5 is a flow diagram illustrating a method 500 of detecting an attack in a computer system, in accordance with an example embodiment. At operation 502, a thread of one or more communications between a first user and a second user in a computer network is accessed. At operation 504, first text from one or more communications originating from the second user of the one or more communications is extracted. At operation 506, second text from one or more communications originating from the first user of the one or more communications is extracted.

At operation 508, the first text is passed into an attack contextualization model, with the attack contextualization model generating a first score indicative of a likelihood that the second user is not who he or she claims to be based on a comparison of factual information in the extracted first text and one or more social networking service user profiles associated with the second user. At operation 510, the first text and the second text are passed into an intention classification model, with the intention classification model including a first machine learned model trained by a first machine learning algorithm to generate a second score indicative of a likelihood that the one or more communications leverage a cognitive bias. At operation 512, the first text and the second text are passed into a security policy violation detection model that generates a third score indicative of a likelihood that the first text or the second text will violate a predefined security policy.

At operation 514, the first, second, and third scores are combined into a global social engineering attack score. At operation 516, the global social engineering attack score is compared with a threshold. At operation 518, an alert is generated if the global social engineering attack score transgresses the threshold.

The following is an example use case, in accordance with an example embodiment. Here, a potential attacker may be attempting to perform a fraud scam. In the context of this scam, content of the communications and of the potential target are extracted and scored by the attack contextualization model 116, the intention classification model 118, and the security policy violation detection model 120. These scores are then combined into a single global social engineering attack score, which is compared with a threshold.

This score calculation and comparison may be performed in phases. In an example embodiment, these phases can correlate with the receipt of additional communications in the thread or stream. For example, the scores may be recalculated for each communication between the potential attacker and the potential target.

In a first phase. the communications may be as follows:

Potential attacker: "Hello Mr X, we are the representative of fraud governmental agency. We know you do seasonal rental, without properly paying due taxes. You risk prosecution and a fine of 10.000 euros."

Potential target "Hummm yes, I admit"

Potential attacker: "You appear to be acting in good faith, so I will send you a form to complete to close the case. But you have to send it back in under 24 hours. Can you give me your email address?"

Potential target: "yes, my email address is . . . "

Here, the attack contextualization score may be 0.5, the intention classification score 4.0, and the security policy violation detection score 1.0. For simplicity, assume that the weighted average of the three is a true average, giving a global social engineering attack score of 1.83.

For the intention classification, there are several cognitive biases recognized in these communications. The first is that the potential target indicates an authority bias ("we are the representative of fraud governmental agency") and the second is an anchoring bias ("you risk prosecution and a fine of 10,000 Euros). A third is a linking bias ("you appear to be acting in good faith, so I will send you a form to complete to close the case") and a fourth is an urgency bias ("you have to send it back in under 24 hours"). The result is a fairly high intention classification score. Nevertheless, the attack contextualization score is low (0.5), and the security policy violation detection score is medium low (due to the disclosure of personal information, namely the potential target's email address, but no other personal details).

The overall global social engineering attack score of 1.83 is then compared to a threshold of 3.0. and it is determined that no alert is needed (yet).

In a second phase, however, the potential attacker sends a communication from a fake government email address, as well as a fake form with a fake logo, and the form requests additional personal data, such as name, address, phone, email, revenue, and job details." The potential target then sends the completed form back and calls the potential attacker on the phone, indicating that he has sent the document to close the case. In response, the following communications occur:

Potential attacker: As you are acting in good faith, we will close the case, but you have to pay closing procedure fees of 99 euros, worth it compared to the fine of 10,000 euros"

Potential target: "huuummm, okay, how should I proceed?"

Potential attacker: "You have to send 99 euros via Online-Payment, here is how to proceed . . . "

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a computer-readable medium storing instructions that, when executed by the at least one hardware processor, cause the at least one hardware processor to perform operations comprising:

accessing a thread of one or more communications between a first user and a second user in a computer network;

extracting first text from one or more communications originating from the second user of the one or more communications;

extracting second text from one or more communications originating from the first user of the one or more communications;

passing the first text into an attack contextualization model, the attack contextualization model generating a first score indicative of a likelihood that the second user is not who he or she claims to be based on a comparison of factual information in the extracted first text and one or more social networking service user profiles associated with the second user;

passing the first text and the second text into an intention classification model, the intention classification model including a first machine learned model trained by a first machine learning algorithm to generate a second score indicative of a likelihood that the one or more communications leverage a cognitive bias;

passing the first text and the second text into a security policy violation detection model that generates a third score indicative of a likelihood that the first text or the second text will violate a predefined security policy;

combining the first, second, and third scores into a global social engineering attack score;

comparing the global social engineering attack score with a threshold; and generating an alert if the global social engineering attack score transgresses the threshold.

Example 2. The system of Example 1, wherein the operations further comprise:

extracting one or more images from communications, among the one or more communications, originating from the second user; and wherein the attack contextualization module further includes a second machine learned model trained by a second machine learning algorithm to determine whether the one or more images are fake.

Example 3. The system of Example 2, wherein the first machine learning algorithm is a multilayer perceptron network that identifies whether a compression ratio of one portion of one of the one or more images is greater than a compression ratio of a remainder of the one of the one or more images.

Example 4. The system of any of Examples 1-3, wherein the intention classification model includes an authority sub-model having a natural language processing portion that classifies phrases into grammatical structures to identify which phrases are authoritative in structure.

Example 5. The system of any of Examples 1-4, wherein the intention classification model includes a likeness sub-model includes a third machine learned model trained by a third machine learning algorithm to identify likeness features in the first text, the likeness features being features that are likely to be similar to a potential target's features in a likeness persuasion portion of an attack.

Example 6. The system of any of Examples 1-5, wherein the intention classification model includes a reciprocity sub-model having a natural language processing portion that classifies phrases in the first text and the second text into categories of reward, reward-seeking, or neither.

Example 7. The system of any of Examples 1-6, wherein the intention classification model includes a scarcity sub-model having a natural language processing portion that classifies phrases in the first text based on language indicative of scarcity or not.

Example 8. The system of any of Examples 1-7, wherein the intention classification model includes a consistency sub-model having a natural language processing portion that classifies phrases in the first text based on whether or not they are asserted facts, the intention classification model further determining whether phrases classified as asserted facts are consistent with each other.

Example 9. The system of any of Examples 1-8, wherein the intention classification model includes a social proof sub-model having a natural language processing portion that classifies phrases in the first text based on whether or not they are asserting social proof.

Example 10. The system of Example 9, wherein the social proof sub-model further determines whether phrases in the first text are repeated in communications from the second user to users other than the first user.

Example 11. The system of any of Examples 1-10, wherein the security policy violation detection model includes a fourth machine learned model trained by a fourth machine learning algorithm to detect that a communication requests information that is subject to a security policy.

Example 12. The system of any of Examples 1-11, wherein the operations further comprise:
performing speech-to-text processing on the one or more communications to generate the first text and the second text.

Example 13. A method comprising:
accessing a thread of one or more communications between a first user and a second user in a computer network;
extracting first text from one or more communications originating from the second user of the one or more communications;
extracting second text from one or more communications originating from the first user of the one or more communications;
passing the first text into an attack contextualization model, the attack contextualization model generating a first score indicative of a likelihood that the second user is not who he or she claims to be based on a comparison of factual information in the extracted first text and one or more social networking service user profiles associated with the second user;
passing the first text and the second text into an intention classification model, the intention classification model including a first machine learned model trained by a first machine learning algorithm to generate a second score indicative of a likelihood that the one or more communications leverage a cognitive bias;
passing the first text and the second text into a security policy violation detection model that generates a third score indicative of a likelihood that the first text or the second text will violate a predefined security policy;
combining the first, second, and third scores into a global social engineering attack score;
comparing the global social engineering attack score with a threshold; and
generating an alert if the global social engineering attack score transgresses the threshold.

Example 14. The method of Example 13, further comprising:
extracting one or more images from communications, among the one or more communications, originating from the second user; and
wherein the attack contextualization module further includes a second machine learned model trained by a second machine learning algorithm to determine whether the one or more images are fake.

Example 15. The method of Example 14, wherein the first machine learning algorithm is a multilayer perceptron network that identifies whether a compression ratio of one portion of one of the one or more images is greater than a compression ratio of a remainder of the one of the one or more images.

Example 16. The method of any of Examples 13-15, wherein the intention classification model includes an authority sub-model having a natural language processing portion that classifies phrases into grammatical structures to identify which phrases are authoritative in structure.

Example 17. The method of any of Examples 13-16, wherein the intention classification model includes a likeness sub-model, which includes a third machine learned model trained by a third machine learning algorithm to identify likeness features in the first text, the likeness features being features that are likely to be similar to a potential target's features in a likeness persuasion portion of an attack.

Example 18. The method of any of Examples 13-17, wherein the intention classification model includes a reciprocity sub-model having a natural language processing portion that classifies phrases in the first text and the second text into categories of reward, reward-seeking, or neither.

Example 19. The method of any of Examples 13-18, wherein the intention classification model includes a scarcity sub-model having a natural language processing portion that classifies phrases in the first text based on language indicative of scarcity or not.

Example 20. A non-transitory machine-readable medium storing instructions which, when executed by one or more processors, cause the one or more processors to perform operations comprising:
accessing a thread of one or more communications between a first user and a second user in a computer network;
extracting first text from one or more communications originating from the second user of the one or more communications;
extracting second text from one or more communications originating from the first user of the one or more communications;
passing the first text into an attack contextualization model, the attack contextualization model generating a first score indicative of a likelihood that the second user is not who he or she claims to be based on a comparison of factual information in the extracted first text and one or more social networking service user profiles associated with the second user;
passing the first text and the second text into an intention classification model, the intention classification model including a first machine learned model trained by a first machine learning algorithm to generate a second score indicative of a likelihood that the one or more communications leverage a cognitive bias;

passing the first text and the second text into a security policy violation detection model that generates a third score indicative of a likelihood that the first text or the second text will violate a predefined security policy;

combining the first, second, and third scores into a global social engineering attack score;

comparing the global social engineering attack score with a threshold; and generating an alert if the global social engineering attack score transgresses the threshold.

Figure 6:
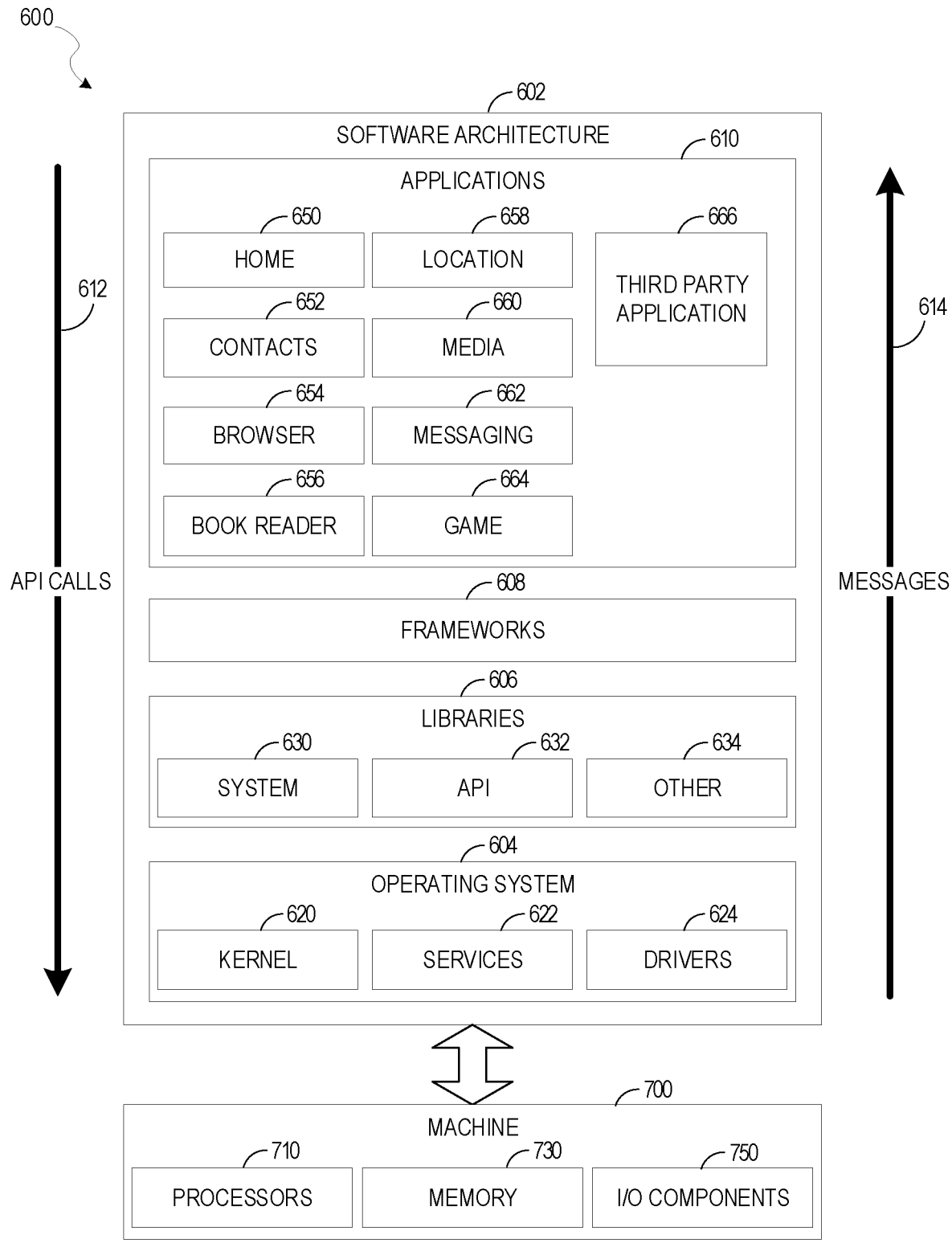
FIG. 6 is a block diagram illustrating an example architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
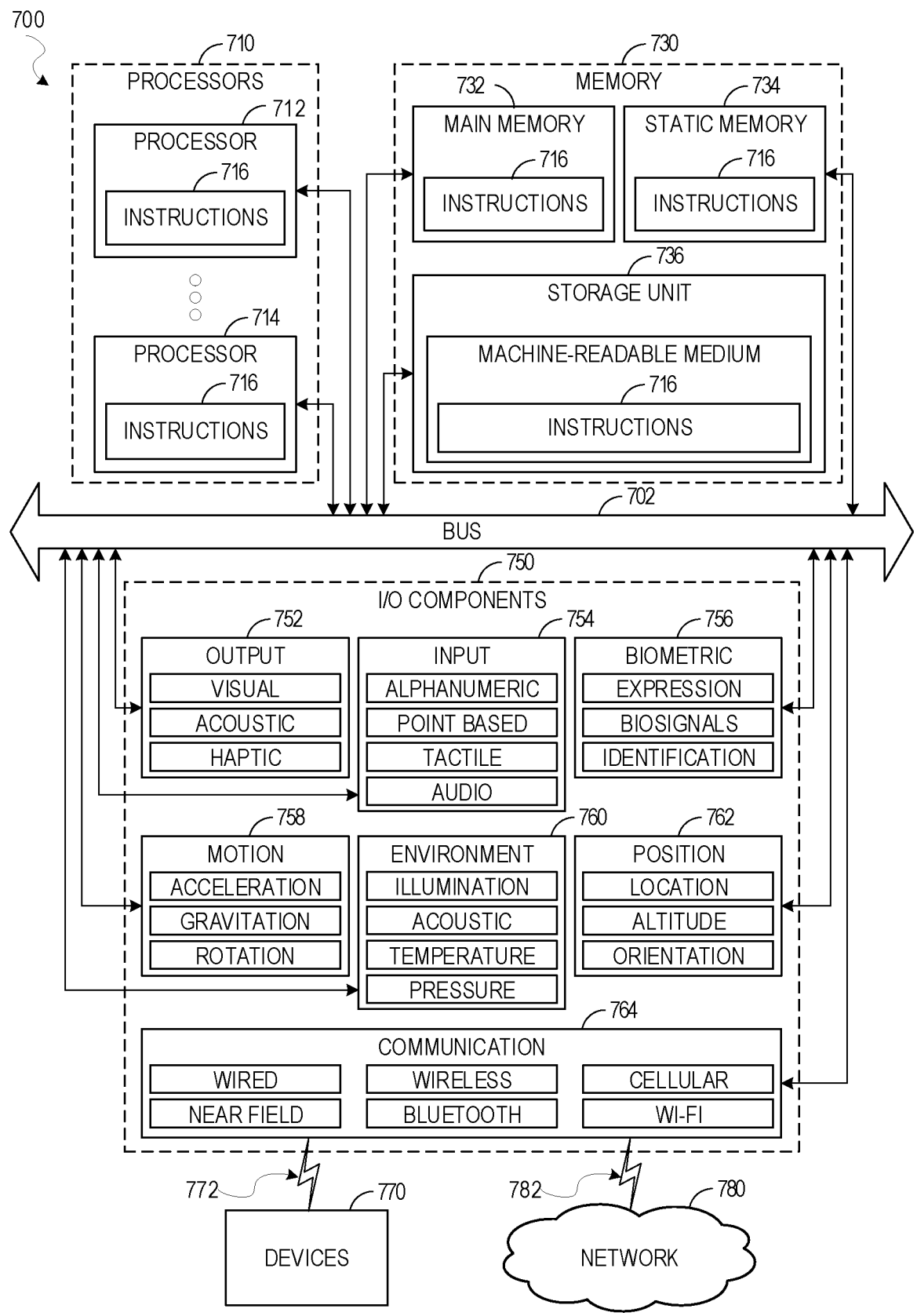
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
        accessing a thread of one or more communications between a first user and a second user in a computer network;
        extracting first text from one or more communications originating from the second user of the one or more communications;
        extracting second text from one or more communications originating from the first user of the one or more communications;
        passing the first text into an attack contextualization model, the attack contextualization model generating a first score indicative of a likelihood that the second user is not who he or she claims to be based on a comparison of factual information in the extracted first text and one or more social networking service user profiles associated with the second user;
        passing the first text and the second text into an intention classification model, the intention classification model including a first machine learned model trained by a first machine learning algorithm to generate a second score indicative of a likelihood that the one or more communications leverage a cognitive bias;
        passing the first text and the second text into a security policy violation detection model that generates a third score indicative of a likelihood that the first text or the second text will violate a predefined security policy;
        combining the first, second, and third scores into a global social engineering attack score;
        comparing the global social engineering attack score with a threshold; and
        generating an alert if the global social engineering attack score transgresses the threshold.

2. The system of claim 1, wherein the operations further comprise:
extracting one or more images from communications, among the one or more communications, originating from the second user; and
wherein the attack contextualization module further includes a second machine learned model trained by a second machine learning algorithm to determine whether the one or more images are fake.

3. The system of claim 2, wherein the first machine learning algorithm is a multilayer perceptron network that identifies whether a compression ratio of one portion of one of the one or more images is greater than a compression ratio of a remainder of the one of the one or more images.

4. The system of claim 1, wherein the intention classification model includes an authority sub-model having a natural language processing portion that classifies phrases into grammatical structures to identify which phrases are authoritative in structure.

5. The system of claim 1, wherein the intention classification model includes a likeness sub-model, which includes a third machine learned model trained by a third machine learning algorithm to identify likeness features in the first text, the likeness features being features that are likely to be similar to a potential target's features in a likeness persuasion portion of an attack.

6. The system of claim 1, wherein the intention classification model includes a reciprocity sub-model having a natural language processing portion that classifies phrases in the first text and the second text into categories of reward, reward-seeking, or neither.

7. The system of claim 1, wherein the intention classification model includes a scarcity sub-model having a natural language processing portion that classifies phrases in the first text based on language indicative of scarcity or not.

8. The system of claim 1, wherein the intention classification model includes a consistency sub-model having a natural language processing portion that classifies phrases in the first text based on whether or not they are asserted facts, the intention classification model further determining whether phrases classified as asserted facts are consistent with each other.

9. The system of claim 1, wherein the intention classification model includes a social proof sub-model having a natural language processing portion that classifies phrases in the first text based on whether or not they are asserting social proof.

10. The system of claim 9, wherein the social proof sub-model further determines whether phrases in the first text are repeated in communications from the second user to users other than the first user.

11. The system of claim 1, wherein the security policy violation detection model includes a fourth machine learned model trained by a fourth machine learning algorithm to detect that a communication requests information that is subject to a security policy.

12. The system of claim 1, wherein the operations further comprising:
performing speech-to-text processing on the one or more communications to generate the first text and the second text.

13. A method comprising:
accessing a thread of one or more communications between a first user and a second user in a computer network;
extracting first text from one or more communications originating from the second user of the one or more communications;
extracting second text from one or more communications originating from the first user of the one or more communications;
passing the first text into an attack contextualization model, the attack contextualization model generating a first score indicative of a likelihood that the second user is not who he or she claims to be based on a comparison of factual information in the extracted first text and one or more social networking service user profiles associated with the second user;
passing the first text and the second text into an intention classification model, the intention classification model including a first machine learned model trained by a first machine learning algorithm to generate a second score indicative of a likelihood that the one or more communications leverage a cognitive bias;
passing the first text and the second text into a security policy violation detection model that generates a third score indicative of a likelihood that the first text or the second text will violate a predefined security policy;
combining the first, second, and third scores into a global social engineering attack score;
comparing the global social engineering attack score with a threshold; and
generating an alert if the global social engineering attack score transgresses the threshold.

14. The method of claim 13, further comprising:
extracting one or more images from communications, among the one or more communications, originating from the second user; and
wherein the attack contextualization module further includes a second machine learned model trained by a second machine learning algorithm to determine whether the one or more images are fake.

15. The method of claim 14, wherein the first machine learning algorithm is a multilayer perceptron network that identifies whether a compression ratio of one portion of one of the one or more images is greater than a compression ratio of a remainder of the one of the one or more images.

16. The method of claim 14, wherein the intention classification model includes an authority sub-model having a natural language processing portion that classifies phrases into grammatical structures to identify which phrases are authoritative in structure.

17. The method of claim 14, wherein the intention classification model includes a likeness sub-model, which includes a third machine learned model trained by a third machine learning algorithm to identify likeness features in the first text, the likeness features being features that are likely to be similar to a potential target's features in a likeness persuasion portion of an attack.

18. The method of claim 14, wherein the intention classification model includes a reciprocity sub-model having a natural language processing portion that classifies phrases in the first text and the second text into categories of reward, reward-seeking, or neither.

19. The method of claim 14, wherein the intention classification model includes a scarcity sub-model having a natural language processing portion that classifies phrases in the first text based on language indicative of scarcity or not.

20. A non-transitory machine-readable medium storing instructions which, when executed by one or more processors, cause the one or more processors to perform operations comprising:

accessing a thread of one or more communications between a first user and a second user in a computer network;
extracting first text from one or more communications originating from the second user of the one or more communications;
extracting second text from one or more communications originating from the first user of the one or more communications;
passing the first text into an attack contextualization model, the attack contextualization model generating a first score indicative of a likelihood that the second user is not who he or she claims to be based on a comparison of factual information in the extracted first text and one or more social networking service user profiles associated with the second user;
passing the first text and the second text into an intention classification model, the intention classification model including a first machine learned model trained by a first machine learning algorithm to generate a second score indicative of a likelihood that the one or more communications leverage a cognitive bias;
passing the first text and the second text into a security policy violation detection model that generates a third score indicative of a likelihood that the first text or the second text will violate a predefined security policy;
combining the first, second, and third scores into a global social engineering attack score;
comparing the global social engineering attack score with a threshold; and
generating an alert if the global social engineering attack score transgresses the threshold.

* * * * *